United States Patent [19]

Greenhalgh

[11] Patent Number: 4,707,686
[45] Date of Patent: Nov. 17, 1987

[54] OVER TEMPERATURE SENSING SYSTEM FOR POWER CABLES

[75] Inventor: Milton S. Greenhalgh, Fairfield, Conn.

[73] Assignee: General Electric Company, Bridgeport, Conn.

[21] Appl. No.: 847,481

[22] Filed: Apr. 3, 1986

[51] Int. Cl.⁴ .............................................. G08B 17/02
[52] U.S. Cl. ...................................... 340/596; 219/505
[58] Field of Search ...................... 340/596; 174/11 R; 219/505, 506

[56] References Cited

U.S. PATENT DOCUMENTS

| | | | |
|---|---|---|---|
| 2,745,944 | 5/1956 | Price | 219/505 |
| 3,175,206 | 3/1965 | Lindberg, Jr. et al. | 340/596 |
| 4,175,437 | 11/1979 | Burt | 340/596 |
| 4,453,159 | 6/1984 | Huff et al. | 340/596 |

FOREIGN PATENT DOCUMENTS

| 87307 | 8/1983 | European Pat. Off. | 304/596 |
|---|---|---|---|
| 128601 | 12/1984 | European Pat. Off. | 304/596 |

Primary Examiner—Stewart J. Levy
Assistant Examiner—Hezron E. Williams
Attorney, Agent, or Firm—Hedman, Gibson, Costigan & Hoare

[57] ABSTRACT

An over temperature sensing system is disclosed that is designed to monitor the temperature in a single or multiwire conductor. The system may be utilized in control cables or in high tension power distribution cables.

4 Claims, 6 Drawing Figures

OVER TEMPERATURE SENSING SYSTEM FOR POWER CABLES

FIELD OF THE INVENTION

The present invention relates generally to a temperature control device and more particularly to a temperature control device adapted to be used with power cables for monitoring, alarming and otherwise responding to an over temperature condition in said power cable.

BACKGROUND OF THE INVENTION

Power cables as presently installed either in the ground, in open conduits where air circulation varies or in the case of large cities in the proximity of underground steam pipes. All these conditions change the temperature profiles of the cable involved. Power cables as presently installed do not include a means for tracking the temperature of the cable conductor, particularly when subjected to overloads. Experience with underground power cables in particular indicate that overload conditions and therefore over temperature conditions can be so severe that the power cables themselves will ignite and combust. Similar experiences include power cables igniting in the walls of buildings when such cables are supplying high power equipment.

Electrical insulating materials having temperature-dependent resistance or capacitance characteristics have long been extensively used in overheat sensing and control applications. Thus, by virtue of the invention of Spooner and Greenhalgh disclosed and claimed in U.S. Pat. No. 2,581,212 overheat protection for electric blankets and similar articles has provided for the use of such materials to afford the essential safety factor. In accordance with the teachings of that patent, the insulating material is operatively associated with switch means and is coextensive with the heating element so that when the temperature anywhere in the blanket exceeds a predetermined maximum, the blanket heating power supply is interrupted. Because this insulating material is not altered physically or otherwise irreversibly changed in so functioning, it is useful repeatedly for this purpose as it acts as a sort of electrical switch constantly monitoring the blanket operating temperature limit.

Spooner, Jr. has further proposed, in U.S. Pat. No. 2,581,213, a temperature responsive signaling and locating system, basically in the form of a temperature sensitive cable, adapted to conventional junction box connections. The thermally-sensitive material in the structure causes operation of an alarm and/or indicating circuit before the thermally-sensitive material is permanently damaged. The Spooner '213 invention consists of three conductors, the third of relatively low resistance, arranged in a voltage measuring circuit. When a sufficiently high temperature is reached at any point along the cable, conduction of current through the thermally-sensitive material separating the first conductors completes a measuring circuit, for example, by deflection of a needle or activation of a bell or other alarm. This is indicative of an abnormal heat condition in the area being monitored.

The over temperature problems associated with power cables have not heretofore been addressed and as discussed above are unique.

It has become apparent from recent underground cable fires that there is a need for such an apparatus which is capable of monitoring, detecting, alarming and otherwise responding to over temperature conditions in power cables along the entire length of the cable.

SUMMARY OF THE INVENTION

The present invention relates to an over temperature sensing (OTS) device adaptable to power cables for monitoring the temperature along the entire length of the cable and capable of interrupting power to the cable when a predetermined temperature is exceeded. In the case of very long cable runs a number of OTS devices may be employed so as to identify local hot spots.

The OTS device includes a sensing wire, a solid state control device, a temperature monitor and an alarm circuit. The sensing wire is contiguous to and along the entire length of the power cable. The solid state control device is adapted to the sensing wire and provides the power to the sensing wire necessary for detecting hot spots within the power cable. The control device is also adapted to a temperature indicator for monitoring the sensing wire temperature and similarly adapted to a relay circuit which trips the alarm circuit when a predetermined maximum temperature is exceeded. The sensing wire comprises a pair of conductors maintained in a uniformly spaced insulated relationship by a flexible organic thermo-sensitive material which at ordinary temperatues is an insulator, but at elevated temperatures exhibits sufficient changes in electrical resistance to conduct significant current at moderate potential levels.

BRIEF DESCRIPTION OF THE DRAWINGS AND DETAILED DESCRIPTION OF THE INVENTION

The following is a detailed description together with the accompanying drawings of an illustrative embodiment of the invention. It is to be understood that the invention is capable of modification and variation apparent to those skilled in the art within the spirit and scope of the invention.

Figure 1:
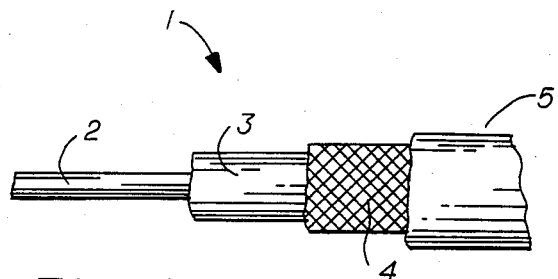
FIG. 1 is a fragmentary, side-elevational view, with parts broken away of the sensing wire of the present invention.

According to the drawings and first to FIG. 1, there is shown the sensing wire 1 of the present invention comprising a detector wire 2 on which a composition of thermal sensitive polymeric material, described hereinafter, has been extruded as a concentric cover 3 so that it is in direct contact with but not necessarily bonded to the wire and extends the full length of the detector wire 2. A second detector wire 4 or braided wrap is applied over the insulating cover 3 and a vinyl jacket 5 is provided to insulate and protect the second detector wire 4. The symmetrical relationship of the several components are illustrated in FIG. 2 which is a transverse cross-sectional view of the sensing wire assembly.

Figure 3:
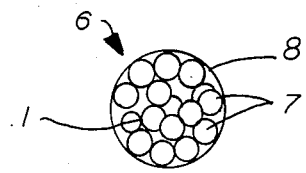
FIG. 3 is a transverse cross-sectional view of the sensing wire as adapted to a power cable according to the present invention.

FIG. 3 shows the position of the sensing wire 1 within a power cable 6 according to the present invention. The power cable 6 includes a network of conductive wires 7 through which electrical power is transmitted. The sensing wire 1 is embedded in the conductive wires 7 and extends throughout the length of the power cable 6. An insulating protective jacket 8 is provided as the final outside insulator.

In the manufacture of the cable 6, the sensing wire 1 may be positioned at any location within the network of conductive wires 7 prior to the application of the protective jacket 8. In a preferred embodiment, the sensing wire 1 is in the proximity of the protective jacket 8 as shown in FIG. 3.

Figure 4:
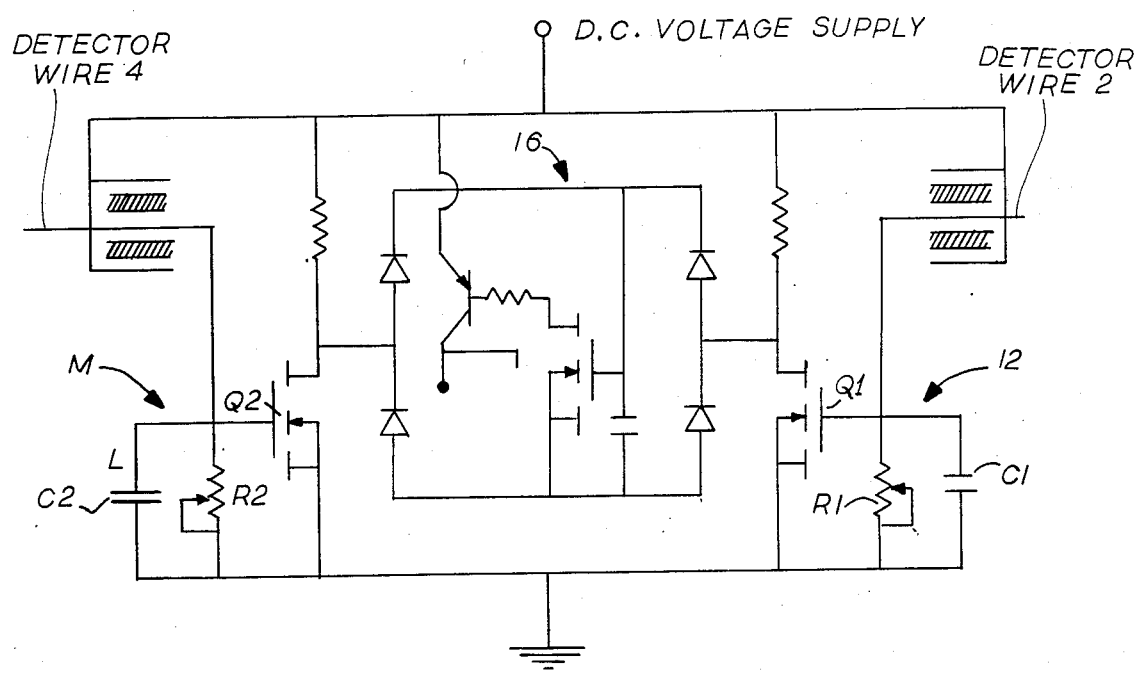
FIG. 4 is a schematic diagram of the solid state control device according to the present invention.

FIG. 4 is an electrical circuit diagram of the solid state controller 9 employed in the OTS device of the present invention.

As illustrated in FIG. 4, the solid state controller 9 comprises a first comparator gate 12, a second comparator gate 14, a differential gate 16 and a D.C. voltage supply.

Figure 5:
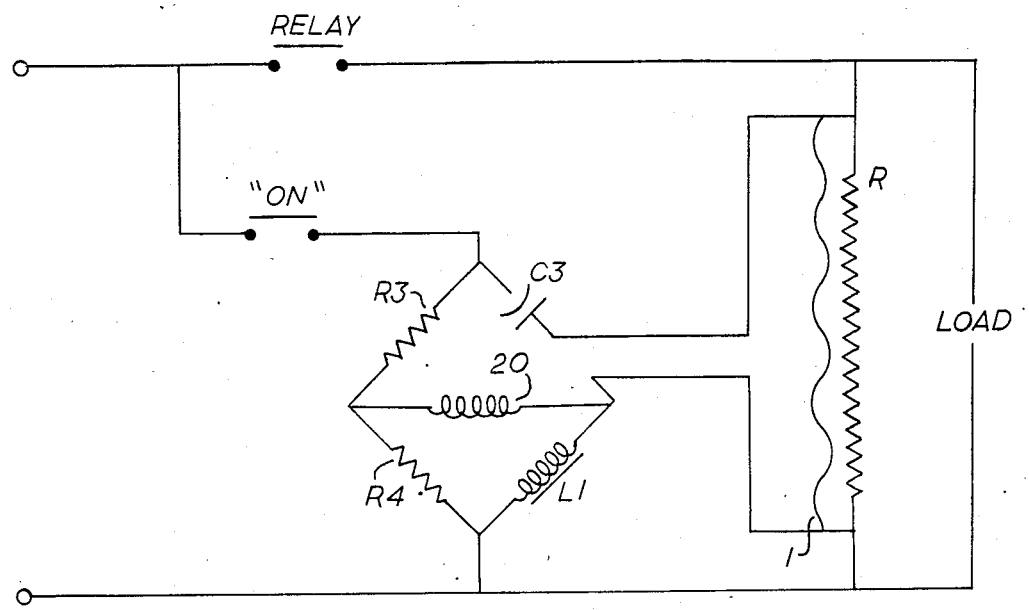
FIG. 5 is a schematic diagram of an alternate embodiment of the solid state control device according to the present invention.

FIG. 5 is an electrical circuit diagram of an alternate embodiment of the solid state controller employing a bridge circuit controller in the OTS device of the present invention.

As illustrated schematically in FIG. 5, the sensing wire 1 is one leg of the bridge circuit wired in parallel to the load or power cable 6. The circuit includes resistors R3 and R4, relay 20; capacitor C3 and inductor coil L1.

The bridge is balanced by adjusting the variable inductor coil to give a null output. If a localized temperature increase occurs, the impedence characteristics of the thermal-sensitive polymeric material changes allowing current to flow therethrough and thereby creating an imbalance in the bridge circuit. This imbalance produces an output voltage through capacitor C3 which opens the load circuit and/or trips an alarm.

Figure 6:
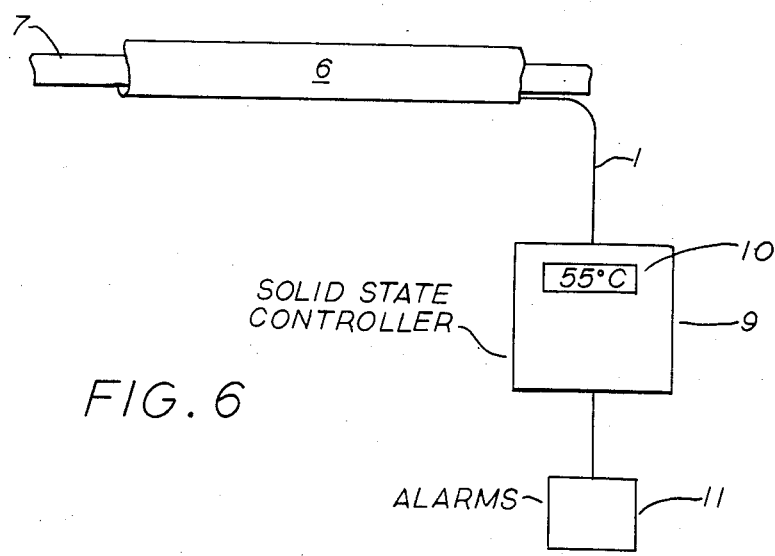
FIG. 6 a diagram of the over temperature sensing system adapted to a power cable for detecting a hot spot along the entire length of the power cable.

FIG. 6 is a schematic diagram illustrating the complete over temperature sensing system for power cables in accordance with the present invention. The system comprises the power cable 6 of FIG. 3 having the sensing wire 1 contiguous to and extending throughout the length of the cable 6, a solid state controller 9 with a temperature indicator 10 and an alarm device 11. The alarm device 11 may be one of any conventional audible and/or visual alarming devices, i.e., siren, lights, etc.

The invention in its broadest sense can be used with any single or multi wire conductor that is used for control cables or power distribution. The OTS device is particularly well suited for use in underground cables capable of providing power service of 5 KV to 138 KV, preferably 15 KV to 30 KV.

In using the device of the present invention, to sense over-temperature conditions along a power cable reference is made to FIG. 6. The power cable 6 is manufactured with the sensing wire 1 disposed within the insulating protective jacket 8 and extending throughout the length of the cable 6. The power cable 6 with the sensing wire 1 may be any of suitable length, but in extremely long runs it is desirable to incorporate a number of individual sensing wires.

The sensing wire 1 is comprised of a copper wire 2 having a diameter of about 20 AWG, and a thermal-sensitive polymeric cover 3 of substantially uniform thickness and about 2-100 mils, preferably 10 mils extruded thereon.

The sensing wire structure employed in the present invention is generally disclosed in U.S. patent application Ser. No. 548,376 to Greenhalgh and is incorporated herein by reference.

Figure 2:
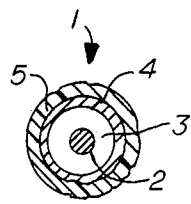
FIG. 2 is a transverse cross-sectional view of the sensing wire of FIG. 1.

Generally, as discussed in Greenhalgh, the concentric cover 3 of FIG. 1 may be a polymeric material such as a nylon polyamide resin, polyvinyl chloride and cellulose esters containing additions imparting the desired electrical characteristics. These thermally redesired sponsive materials all have a high negative coefficient of specific inductive conductibe (S.I.C.) or have a positive temperature coefficient of resistance (P.T.C.). However, Greenhalgh proposes the use of acrylonitrile butadiene rubber which has an SIC ratio of 90° C. to room temperature which is higher than the previously known materials by a factor of 3 to 5. In addition, the acrylonitrile butadiene rubber contains substantially no free or elemental sulfur, the presence of which can corrode the copper wire conductors. It has been further found by Greenhalgh that these substances are thermosetting and thus not subject to deformation or to additive migration which would be detrimental to the intended purpose or function. In addition, these compositions are amenable to compounding with additives enhancing their temperature sensitivity characteristics. In particular, where the compositions contain at least 0.5% of carboxylic units by weight, resistance to high temperature aging is enhanced as are physical properties together with the ratio of change in electrical response for S.I.C. as the temperature is increased room temperature to 90° C. Other additions, such as polyvinyl chloride and clay may be blended into the compositions to improve the characteristics of the formulations.

The cover material 3 is preferably selected from the group consisting of cured acrylonitrile butadiene rubber containing at least one per cent acrylonitrile and substantially no free sulfur, cured acrylonitrile butadiene rubber containing at least 0.5 per cent carboxylic acid monomer units and polyvinyl blends of said rubbers.

Upon installation of the power cable 6, the detector wires 2 and 4 of the sensing wire are connected to the solid state controller 9. Detector wire 2 from sensing wire 1 is connected through the first comparator gate 12 comprising capacitor C1, transistor Q1 and a variable resistor R1.

The second detector wire 4 from sensing wire 1 is connected through the second comparator gate 14 comprising capacitor C2, transistor Q2 and a variable resistor R2. The D.C. voltage is applied to the controller circuit and the D.C. resistance across detector wires 2 and 4 are monitored continuously.

At ambient or start-up temperature, comparator gates 12 and 14 are adjusted to the same voltage by adjustment of variable resistors R1 and R2, respectively. At an elevated temperature of 35° C., the two comparator gates are again adjusted to a different common reference voltage to establish the sensitivity and calibration of the device.

Differential gate 16 comprises four diodes, four transistors, and four resistors. The differential gate 16 functions to monitor differentials in potential between comparator gates 12 and 14 and when a preset voltage differential of 0.1-10 volts preferably 0.7 volt is attained, triggers alarm device 11. In addition, a relay may be provided which shunts the power feed circuit of cable 6 to obviate the over-temperature condition thereby preventing an underground fire.

Alarm device 11 may be any conventional system including audible, flashing light, etc.

The invention in its broader aspects is not limited to the specific described embodiment within the scope of the accompanying claims without departing from the principles of the invention and without sacrificing its chief advantages.

I claim:

1. An assembly which comprises an over temperature sensing device adapted to monitor, detect, alarm and otherwise respond to an over temperature condition and a single or multiwire conductor, comprising:
   (a) a sensing wire contiguous to and coextensive with a power cable comprising a single or multiwire conductor within a protective jacket, said sensing wire having a first detector wire and a second detector wire both of which are connected to an electric power source said first and second detector wires being uniformly spaced apart over their full lengths by a thermal-sensitive polymeric material selected from the group consisting of nylon polyamide resin, polyvinyl chloride, cellulose esters, cured acrylonitrile butadiene rubber containing at least one per cent acrylonitrile and substantially no sulfur, cured acrylonitrile butadiene rubber containing at least 0.5 per cent carboxylic acid monomer units and polyvinyl chloride blends of said rubbers extruded as a cover concentric to and coextensive with said first detector wire;
   (b) a solid state control device having two terminals in electrical circuit with said power cable and means for continuously monitoring and displaying changes in electrical resistance through said thermal-sensitive cover; and
   (c) alarm emans operatively connected to said solid state control device for identifying an over-temperature condition in said power cable.

2. The assembly of claim 1, in which said polymeric material in an acrylonitrile butadiene rubber containing 25 to 45% acrylonitrile monomer units.

3. The assembly of claim 1, in which said polymeric material is cured acrylonitrile rubber that admixed and compounded with zinc oxide as the curing agent and the mixture contains at least 7% Catalpo clay, the compounded polymeric material having specific inductive capacitance ratio at 90° C. and at room temperature greater than 30°.

4. The assembly of claim 1 or in which said solid state controller device comprises a first comparator gate 12 in electrical circuit with said first detector wire for measuring the resistance across said first detector wire, a second comparator gate 14 in electrical circuit with said second detector wire for measuring the resistance across said second detector wire, a differential gate for measuring differentials in potential between said gates 12 and 14 so that when a preset voltage differential of 0.1 to 10 volts between said gates is attained a relay actuates said alarm means while simultaneously shunting the electrical circuit providing electrical current to said power cable.

* * * * *